United States Patent
Koivisto et al.

(10) Patent No.: US 9,172,438 B2
(45) Date of Patent: Oct. 27, 2015

(54) DEVICES AND METHODS RELATED TO CONTROLLING UE ASSUMPTION OF INTERFERENCE

(75) Inventors: Tommi Koivisto, Espoo (FI); Helka-Liina Maattanen, Helsinki (FI); Mihai Enescu, Espoo (FI); Marko Lampinen, Oulu (FI)

(73) Assignee: BROADCOM CORPORATION, Irvine, CA (US)

(*) Notice: Subject to any disclaimer, the term of this patent is extended or adjusted under 35 U.S.C. 154(b) by 794 days.

(21) Appl. No.: 13/292,205

(22) Filed: Nov. 9, 2011

(65) Prior Publication Data
US 2013/0114430 A1    May 9, 2013

(30) Foreign Application Priority Data
Nov. 7, 2011 (GB) .................................. 1119208.5

(51) Int. Cl.
H04J 1/16 (2006.01)
H04B 7/02 (2006.01)
H04B 7/06 (2006.01)
H04L 12/28 (2006.01)

(52) U.S. Cl.
CPC .............. H04B 7/024 (2013.01); H04B 7/0617 (2013.01); H04B 7/0632 (2013.01)

(58) Field of Classification Search
USPC .................................. 370/252, 329, 430, 278
See application file for complete search history.

(56) References Cited

U.S. PATENT DOCUMENTS

| 8,755,807 B2 * | 6/2014 | Gorokhov et al. ............. 455/450 |
| 2010/0215075 A1 | 8/2010 | Jonsson et al. |
| 2012/0026955 A1 * | 2/2012 | Benjebbour et al. .......... 370/329 |
| 2012/0208547 A1 * | 8/2012 | Geirhofer et al. .......... 455/452.2 |
| 2012/0281556 A1 * | 11/2012 | Sayana et al. ................. 370/252 |
| 2013/0028109 A1 * | 1/2013 | Jongren et al. ............... 370/252 |

(Continued)

FOREIGN PATENT DOCUMENTS

| CN | 101 997 587 A | 3/2011 |
| WO | WO-2009/115136 A1 | 9/2009 |

OTHER PUBLICATIONS

EP Combined Search and Examination Report under Sections 17 and 18(3) issued for corresponding GB Patent Application No. GB 1119208.5, Feb. 23, 2012.

(Continued)

*Primary Examiner* — John Pezzlo
(74) *Attorney, Agent, or Firm* — Oblon, McClelland, Maier & Neustadt, L.L.P.

(57) ABSTRACT

To control UE assumption of interference there is a controller module to control a plurality of transmission points, each constituted by a set of at least one transmit antenna, to transmit data to another device in a coordinated transmission from at least a subset of the plurality of transmission points. The controller module is configured to allocate, to each resource linked to the subset of the plurality of transmission points, an interference contribution parameter that is indicative of an expected interference contribution originating from said transmission point, and to inform said another device of those resources to which the subset of the plurality of transmission points is linked, together with the respective interference contribution parameter allocated to each resource. Another device reports feedback based on signals which are scaled with the respective interference contribution parameter.

28 Claims, 3 Drawing Sheets

(56) References Cited

U.S. PATENT DOCUMENTS

2014/0153534 A1* 6/2014 Kim et al. .................. 370/329
2015/0117381 A1* 4/2015 Khoshnevis et al. ......... 370/329

OTHER PUBLICATIONS

3GPP TS 36.331 V10.3.0 (Sep. 2011), "$3^{rd}$ Generation Partnership Project; Technical Specification Group Radio Access Network; Evolved Universal Terrestrial Radio Access (E-UTRA); Radio Resource Control (RRC); protocol specification (Release 10)" 296 pages.

3GPP TR 36.819 V11.0.0 (Sep. 2011), "$3^{rd}$ Generation Partnership Project; Technical specification Group Radio Access Network; Coordinated multi-point operation for LTE physical layer aspects (Release 11)", 68 pages.

3GPP TS 36.213 V120.3.0 (Sep. 2011), "$3^{rd}$ Generation Partnership Project; Technical Specification Group Radio Access Network; Evolved Universal Terrestrial Radio Access (E-UTRA); Physical layer procedures (Release 10)", 122 pages.

Nokia et al: 'Remaining aspects of CSI-RS Parameters and Signaling', 3GPP Draft; R1-105528, 3rd Generation Partnership Project (3GPP), Mobile Competence Centre '650, Route des Lucioles 'F-06921 Sophia-Antipolis Cedex, France, vol. RAN WG1, No. Xi 'an; 2010101, Oct. 2010 (Oct. 5, 2010)' XP050450639, p. 1-p. 3.

Huawei et al: 'Proposal for specification of POSCH Muting',3GPP Draft; R1-105132, 3rd Generation Partnership Project (3GPP), Mobile Competence Centre, 650, Route des Lucioles , F-06921 Sophia-Antipolis Cedex, France, vol. RAN WG1, No. Xi 'an; 20101011, Oct. 5, 2010, XP050450353, p. 1-p. 2.

'3rd Generation Partnership Project; Technical Specification Group Radio Access Network; Evolved Universal Terrestrial Radio Access (E-UTRA); Physical layer procedures (Release 10)',3GPP Standard; 3GPP TS 36.213, 3rd Generation Partnership Project (3GPP), Mobile Competence Centre ; 650, Route des Lucioles , F-06921 Sophia-Antipolis Cedex, France, vol. RAN WG1, No. V10.3.0, Sep. 25, 2011, pp. 1-122, XP050553950.

* cited by examiner

DEVICES AND METHODS RELATED TO CONTROLLING UE ASSUMPTION OF INTERFERENCE

CROSS REFERENCE TO RELATED APPLICATION

This application claims benefit under 35 U.S.C. §119(a) and 37 CFR 1.55 to UK Patent Application 1119208.5, filed on Nov. 7, 2011.

FIELD OF THE INVENTION

The present invention relates to devices, methods and computer program products configured to be deployed in a scenario for mobile communication which scenario comprises a plurality of transmission points, each constituted by a set of at least one transmit antenna, for transmitting data to another device in a coordinated transmission from at least a subset of the plurality of transmission points. More particularly, it relates to such devices, methods and computer program products related to controlling UE assumption of interference.

BACKGROUND

Mobile data transmission and data services are constantly making progress. With the increasing penetration of such services, data throughput and transmission reliability find more and more attention.

Under one aspect, investigation is made in scenarios for mobile communication which comprise a plurality of transmission points, each constituted by a set of at least one transmit antenna, for transmitting data to another device in a coordinated transmission from at least a subset of the plurality of transmission points.

It should be noted that concepts outlined in connection with the present invention are generally independent of any particular communication standard; rather, they are generally applicable to a variety of compatible standards. In order to properly describe the concept(s), however, for explanatory purposes only and without any intention to limit the applicability of the concept(s) introduced in the specification to a particular standard, those concept(s) are described with reference to an example scenario. As the example scenario, LTE (Long Term Evolution) and/or LTE-A (LTE-Advanced) was chosen for the network infrastructure.

That is, e.g. in the 3rd Generation Partnership Project (3GPP) Long Term Evolution (LTE) and LTE-Advanced (LTE-A), single cell single-user (SU-) and multi-user (MU-) multiple-input multiple-output (MIMO) network performance is interference-limited, especially at the cell edge.

Therefore, introduction of the coordinated multipoint (CoMP) transmission/reception technology has been considered, where in downlink (from a network device such as an eNB (evolved NodeB) towards a terminal such as a user equipment UE), multiple points co-operate in scheduling and transmission in order to strengthen desired signal and mitigate inter-cell interference. According to e.g. the 3GPP technical report on CoMP, TR36.819, a point is defined as a set of geographically co-located transmit antennas and the sectors of the same site correspond to different points. It should be noted that a cell is formed by one or multiple points.

The above mentioned CoMP TR was approved after a recent RAN meeting. The agreed CoMP working item definition proposes the following focus for the CoMP work during a subsequent release (e.g. Rel-11):

"The work for specifying CoMP support in Rel-11 should focus on
Joint transmission (JT)
Dynamic point selection (DPS), including dynamic point blanking
Coordinated scheduling/beamforming (CS/CB), including dynamic point blanking".

In joint transmission (JT) CoMP, two or more points transmit simultaneously to a CoMP user. Dynamic point selection (DPS) on the other hand refers to a scheme where the transmission point is switched according to changes in signal strength. In coordinated beamforming/scheduling (CB/CS), in turn, the scheduling decisions of neighbor points are coordinated in order to reduce interference. In principle, all schemes may include blanking/muting which means that one or more transmission points are blanked/muted (switched off or not used for transmission) to decrease the interference.

The agreed CoMP working item targets specification of intra-cell and inter-cell DL CoMP schemes which operate in homogeneous and heterogeneous configurations. Four main scenarios have been studied so far:
intra-site (scenario 1),
inter-site with high power remote radio head (RRH) (scenario 2),
low power RRH within the coverage of the macro cell, without and with the same cell ID (scenarios 3 and 4, respectively).

CoMP working item addresses both frequency division duplex FDD and time division duplex TDD. Hence, unified solutions should be targeted, as it is always the case in LTE specifications.

CoMP is intended to improve the performance of cell edge users, as especially at cell edge the performance is interference limited. A CoMP measurement set is formed by M cells/points for which the UE is measuring channel state information. The reporting set has been limited to N cells/points defining the number of points for which CSI feedback is reported. A common assumption has been that the CoMP reporting set is formed by two to three points. Also the CoMP reporting set could be equivalent to the CoMP measurement set. The number of points involved in CoMP scheme (cooperation set) does not need to be signaled to the UE or mentioned in specifications but is left for network implementation. The point from which the UE would receive transmission in single-cell mode is defined as the serving point.

In Release 10, different reference signals (RS) were defined for CSI estimation and data demodulation purposes. Namely, channel state information reference symbols (CSI-RS) and demodulation reference symbols (DM-RS).

Such reference symbols are assigned to (specific) physical resource elements RE within physical resource blocks PRB. A resource element RE is represented by a time slot and a frequency (bandwidth) assigned to it within the frequency-time domain. A plurality (defined number) of resource elements in frequency/bandwidth domain form a physical resource block PRB (in frequency domain), and a plurality of PRBs are present within a channel.

PDSCH (Physical downlink shared channel) resource element muting is also specified, allowing for multi-cell channel estimation. The baseline feedback has been agreed to be implicit feedback which consists of rank indicator (RI), precoding matrix index (PMI) and a channel quality indicator (CQI). Hence, the UE estimates the channel, selects rank and PMI and calculates the post-processing (after receiver) SINR (signal to interference noise ratio) and derives the CQI based on that. CQI may be seen as indicative of the post processing SINR. Release 10 feedback operates per point. The CoMP specific flavors are that a UE may receive CSI-RS resources from more than one point and it is possible to design aggregated (over multiple CSI-RS resources) or per point (per CSI-RS resource) feedback. The per-point PMIs may be improved by a combiner feedback that may be an inter-point phase and/or amplitude value.

Table 1 summarizes the feedback and channel estimation options for each CoMP scheme.

TABLE 1

Feedback for different CoMP schemes

|  | JT | DPS + muting | CS/CB + muting |
|---|---|---|---|
| Feedback | 1) Per point PMI/CQI (+ combiner) 2) Per point PMI (+combiner) + aggregated CQI + serving point CQI 3) Aggregated PMI/CQI + serving point PMI/CQI | Per point PMI/CQI + point selection + possible muting indication | Per point PMI/CQI or CS/CB + muting specific additional feedback |
| Channel estimation | Per point CSI-RS or aggregated single CSI-RS pattern | Per point CSI-RS | Serving point CSI-RS + possibly other point CSI-RS |

During a recent RAN meeting, the following working assumption was agreed:

"Definition: "CSI-RS resource" here refers to a combination of "resourceConfig" and "subframeConfig" which are configured by higher layers.

Standardize a common feedback/signaling framework suitable for scenarios 1-4 that can support CoMP JT, DPS and CS/CB. Feedback scheme to be composed from one or more of the following, including at least one of the first 3 sub-bullets:
 feedback aggregated across multiple CSI-RS resources
 per-CSI-RS-resource feedback with inter-CSI-RS-resource feedback
 per-CSI-RS-resource feedback
 per cell Rel-8 CRS-based feedback
 Note that use of SRS sounding reference signal (SRS) used in uplink measurement may be taken into account when reaching further agreements on the above."

The CoMP problem relates mostly to the CQI feedback. The CQI is used by the eNB to perform adaptive modulation and coding which means the transmission rate is adapted based on channel conditions. Accuracy of the CQI value affects greatly on the system performance, especially if the CQI is overestimated and too high transmission rate is assigned which is not supported by the actual radio link. The CQI depends on the transmission hypotheses made by UE at a given time. For example:
 When reporting an aggregated JT CQI, UE assumes combined transmission from N points to the UE,
 When reporting a DPS CQI without muting, UE assumes transmission from a selected transmission point and interference from other transmission points,
 When reporting a DPS CQI with muting, UE assumes transmission from one point and zero interference from points that are assumed to be muted,
 When reporting CQI for CS/CB, UE assumes transmission from one point and reduced interference or muting from other transmission points.

In addition to the transmission hypothesis, the CQI value depends on the hypothesis of the interference. The exact interference level depends on the exact scheduling decisions and used PMIs in the other cells at time of transmission. It follows that the level of the exact interference is not known at the UE at the time when CQI is evaluated. The UE is not aware of a scheduling decision of any eNB without signaling, and moreover, the scheduling decisions affecting the experienced interference level are not yet even made, and thus cannot be signaled even if that kind of signaling would be possible. For the case of CS/CB, the coordination between points reduces the level of interference but the level of interference reduction is typically not known by the UE.

In a recent RAN1 meeting, several companies contributed aspects related to CoMP CQI. Out of these, one did not discuss the CQI derivation details. Others presented equations on how the eNB can derive the CQI for joint transmission from per point CQIs with a given assumption on interference. The assumptions on how the UE would estimate the interference level for the per-point CQIs was not considered.

A further contribution discusses measurement objectives as follows "Observation 1: for each CoMP scheme, considering the coordination method, the interference should "Include signals from all the points/cells outside of the transmission set or coordination set, Consider the actual resource elements causing interference to the PDSCH, Not include signals from the point/cell the UE assumes as transmitting the PDSCH, Not include signals from the point/cell with blanking on some or all resource elements".

But no concrete scheme for implementation is discussed/presented.

A more related prior art addressing estimation of interference level for deriving a CQI can be found in a previous standard. The energy per resource element (EPRE) is assumed to be different for the CSI-RS from which the channel is estimated and for the PDSCH where the data is transmitted. As stated in TS36.213, V.10.3.0, section 7.2.5, a parameter P_c is defined that indicates the ratio between PDSCH EPRE and CSI-RS EPRE and it is signaled to the UE. The parameter is referenced as p-C-r10 in TS36.331 v.10.3.0 in section 6.3.2. This parameter is part of the PhysicalConfigDedicated information element used to specify the UE specific physical channel configuration on a transmission carrier. This parameter is needed for the CQI derivation in current system, and the parameter is user and transmission frequency specific.

Assuming that UE estimates signal power from the CSI-RS, $P_0$, and other cell interference and noise power N, the final CQI is based on the SINR=P_c $P_0$/N. Thus the current definition of P_c is applied to the "useful" (payload) signal transmission to the UE.

Thus, existing and/or discussed systems for CoMP still lack fully appropriate feedback from terminals so as to properly estimate/take into account also interference experienced by the terminals.

Thus, there is still a need to further improve such systems.

SUMMARY

Various aspects of examples of the invention are set out in the claims.

According to a first aspect of the present invention, there is provided
 a device, comprising a controller module, configured to control a plurality of transmission points, each constituted by a set of at least one transmit antenna, to transmit data to another device in a coordinated transmission from at least a subset of the plurality of transmission points, wherein the controller module is configured to allocate, to each resource linked to the subset of the plurality of transmission points designated for transmission towards the another device, an interference contribution parameter that is indicative of an expected interference contribution originating from said transmission point, and to inform said another device of those resources to which the subset of the plurality of transmission points designated for transmission towards the another device is linked, together with the respective interference contribution parameter allocated to each resource, as well as a device, comprising a controller module, configured to report feedback to another device responsive to the another device's coordinated transmission from at least a subset of a plurality of transmission points, each transmission point being constituted by a set of at least one transmit antenna, wherein the controller module is configured to receive, for each resource to which the subset of the plurality of transmission points designated for the another device's coordinated transmission is linked, a respective interference contribution parameter allocated to each resource and indicative of an expected interference contribution originating from said respective transmission point, measure a channel transfer function for each channel established towards the device by a respective resource to which the subset of the plurality of transmission points designated for the another device's coordinated transmission is linked, measure interference originating from resources not linked to said subset of the plurality of transmission points, obtain a feedback signal indicative of the channel quality for each resource linked to the subset of the plurality of transmission points and transmitting a payload signal, derive a feedback signal indicative of the channel quality for each resource linked to the subset of the plurality of transmission points and transmitting an interfering signal, sum the derived feedback signals scaled with the respective interference contribution parameter allocated to the respective resource, and the measured interference, and select a reporting signal for being fed back to the another device based on the result of summing and the respective channel quality.

According to a second aspect of the present invention, there is provided a method, comprising controlling a plurality of transmission points, each constituted by a set of at least one transmit antenna, to transmit data to another device in a coordinated transmission from at least a subset of the plurality of transmission points, allocating, to each resource linked to the subset of the plurality of transmission points designated for transmission towards the another device, an interference contribution parameter that is indicative of an expected interference contribution originating from said transmission point, and informing said another device of those resources to which the subset of the plurality of transmission points designated for transmission towards the another device is linked, together with the respective interference contribution parameter allocated to each resource. as well as a method, comprising reporting feedback to another device responsive to the another device's coordinated transmission from at least a subset of a plurality of transmission points, each transmission point being constituted by a set of at least one transmit antenna, receiving, for each resource to which the subset of the plurality of transmission points designated for the another device's coordinated transmission is linked, a respective interference contribution parameter allocated to each resource and indicative of an expected interference contribution originating from said respective transmission point, measuring a channel transfer function for each channel established towards the device by a respective resource to which the subset of the plurality of transmission points designated for the another device's coordinated transmission is linked, measuring interference originating from resources not linked to said subset of the plurality of transmission points, obtaining a feedback signal indicative of the channel quality for each resource linked to the subset of the plurality of transmission points and transmitting a payload signal, deriving a feedback signal indicative of the channel quality for each resource linked to the subset of the plurality of transmission points and transmitting an interfering signal, summing the derived feedback signals scaled with the respective interference contribution parameter allocated to the respective resource, and the measured interference, and selecting a reporting signal for being fed back to the another device based on the result of summing and the respective channel quality.

Advantageous further developments are as set out in respective dependent claims.

According to a third aspect of the present invention, there are provided computer program products comprising respective computer-executable components which, when the program is run on a computer, are configured to perform the above method aspects, respectively.

The above computer program product may further comprise computer-executable components which, when the program is run on a computer, perform the method aspects mentioned above in connection with the method aspects.

The above computer program product/products may be embodied as a computer-readable storage medium.

The methods, devices and computer program products described in this document use, at least in exemplary embodiments, a UE based feedback such as CQI in support of CoMP, wherein the feedback signals are based on UE assumptions of interference when computing CQI. The UE is informed of those assumptions to use and those are thus controlled by a network device such as an eNB.

This invention thus improves interference estimation for CoMP, and in particular controls the UE assumption about the interference, i.e. how to make the UE to take coordination into account in CQI reporting. Under at least one aspect, this is achieved by, among other features, the introduction of transmission antenna port or transmission point-specific parameters which are referred to herein as "interference contribution parameters" (or also named "power offset parameter") and which are indicative of an expected interference contribution originating from a respective transmission point.

Thus, performance improvement is based on methods, devices and computer program products enabling such feedback to be provided contribute to an improved CQI estimation for CoMP, provide for a simple implementation of coordinated beamforming/scheduling-type of CoMP schemes, while alleviating a need to consider spatial information feedback for coordinated beamforming purposes.

With the interference contribution parameters (aka power offset parameters), the eNB can control the UE assumption about the interference power, which will be useful for example if the eNB is doing coordinated beamforming or scheduling in order to reduce the interference levels. Such an approach avoids having to rely on spatial information feedback (e.g. best companion PMI feedback) for coordinated beamforming CQI calculations.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Exemplary aspects of the invention will be described herein below.

Figure 1:
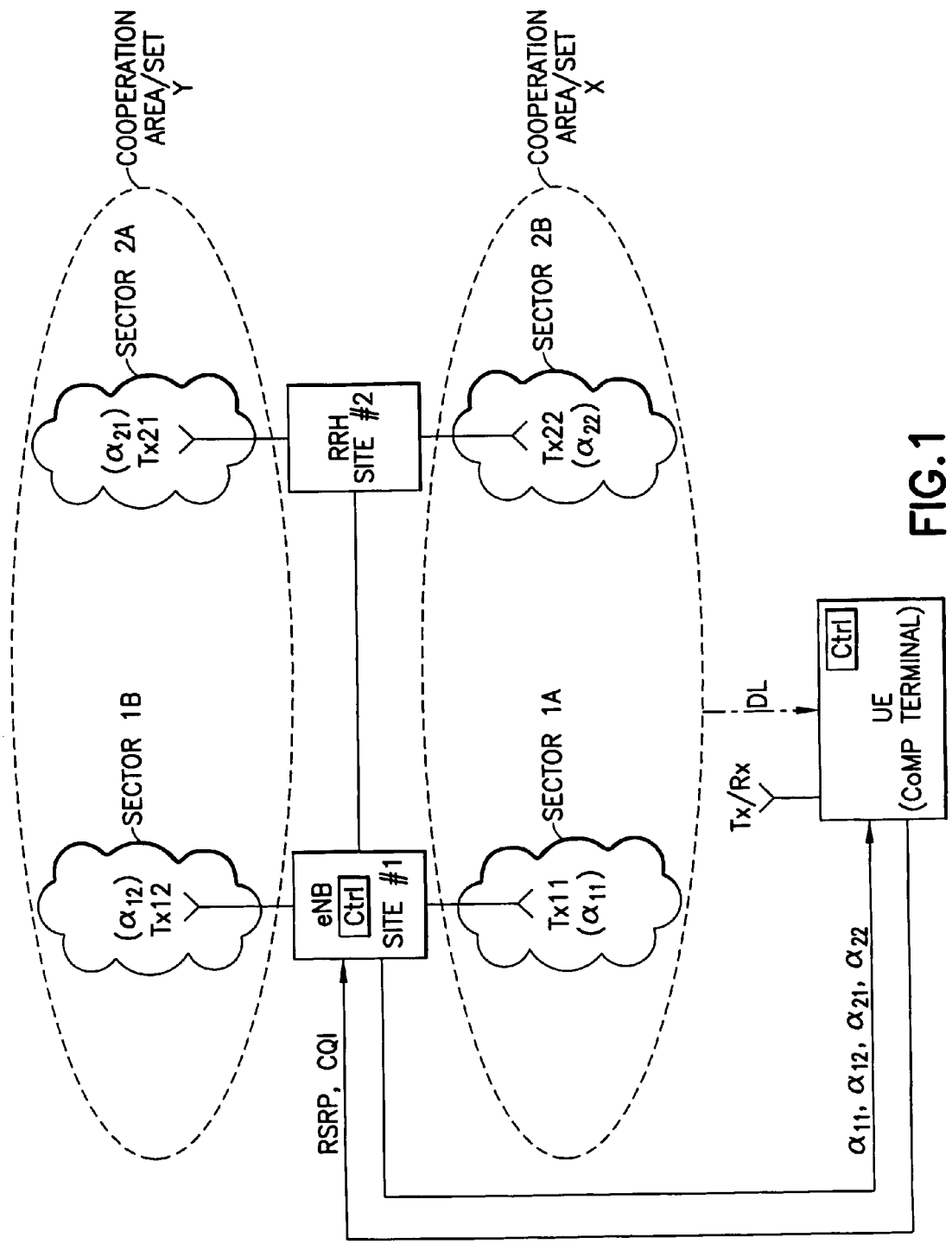
FIG. 1 illustrates an overview of devices/entities involved.

Generally, the invention is implemented in a framework for a coordinated transmission from multiple points or antennas, as illustrated in rough outline in FIG. 1.

FIG. 1 illustrates an overview of devices/entities involved with reference to entities known from LTE/LTE-A. Other names may be assigned to similar entities in other standards, while as long as the functionality imparted thereto remains the same or substantially similar, the present invention s described herein below will remain applicable also to those other standards.

As shown in FIG. 1, an eNB at site #1 comprises a control module as well as transmitter antennas Tx12 and Tx11 defining sectors 1B and 1A, respectively, each sector representing one point (as a set of at least one geographically co-located antenna). The eNB has (is connected to) also one (potentially also more) remote radio heads RRH at another site, site #2. The RRH at site #2 is under control of the eNB and comprises transmitter antennas Tx21 and Tx22 defining sectors 2A and 2B, respectively, each sector representing one point. (Note that as illustrated in FIG. 1, to Tx21 and Tx22, respectively, a parameter alpha ($\alpha$) is assigned; these correspond to sets of antennas, a set may be minimum one, but as LTE is MIMO based, it is possible to be two or more.) Sectors 1A and 2B form a cooperation area/set x, while Sectors 1B and 2A form cooperation area/set y. To each point is associated a parameter alpha_11 ($\alpha\_11$), alpha_12 ($\alpha\_12$), alpha_21 ($\alpha\_21$), and alpha_22 ($\alpha\_22$). In case of only one antenna (or antenna port) being allocated to a point, the parameter alpha of the point may be identical to the parameter of the antenna, otherwise, it is derived from the plurality of the antenna parameters constituting the point. The eNB and RRH transmit in cooperating mode from cooperation sets in downlink DL to a terminal or user equipment UE. DL transmission from points Tx11, Tx22 forming cooperation area x, and DL transmission from points Tx12 and Tx21 forming cooperation area y represent a joint transmission JT mode or dynamic point selection DPS mode.

Transmission from the transmission points is performed using specific resources i.e. resource elements RE within the PRB, and thus the parameters alpha_11, alpha_12, alpha_21, alpha_22 are assigned to those resources which are thus linked to the transmission points. Transmissions used for measurement purposes are referred to as reference signals RS. Thus, transmission from eNB to the UE for measurement purposes to derive a channel state indication/information CSI are accomplished in so-called CSI-RS reference signals in specific resource elements RE within a PRB.

Hence, the eNB represents a device comprising a controller module, configured to control a plurality of points, each constituted by a set of at least one transmit antenna, to transmit data to another device in a coordinated transmission from at least a subset of the plurality of points. The controller module is configured to allocate, to each resource linked to the subset of the plurality of points designated for transmission towards the another device UE, an interference contribution parameter that is indicative of an expected interference contribution originating from said point. This is the parameter alpha_11, alpha_12, alpha_21, alpha_22 (and/or the CSI-RS configuration parameter).

The terminal UE sends in uplink (UL) direction a signal RSRP (reference signal received power) to the eNB, receives interference contribution parameter(s) "alpha" indicative of an expected interference contribution originating from a respective point, processes this parameter along with other estimated parameters, and returns a channel quality indication CQI to the eNB.

This will be detailed further herein below in various aspects involved. As outlined above, at least aspects of the invention comprise a CoMP CQI measurement framework for support of various different CoMP schemes.

Insofar, the invention consists of at least the following two aspects:

Interference measurement:
  UE measures the interference underlying the whole CoMP reporting set, and adds (performs a summing of) interference from selected CSI-RS resources (points) according to the assumed CoMP transmission hypothesis;

Scaling of the interference coming from points that are part of the CoMP reporting set:
  The eNB signals to the UE potentially CSI-RS resource (point)—specific interference contribution parameter(s) "alpha" (aka power offsets parameters). These are the parameters (power offsets) that the UE should assume between CSI-RS and PDSCH when estimating the interference.

The signaling for informing the UE of these parameters can be based on higher layer signaling such as radio resource control, RRC, signaling, or alternatively a faster solution based on using the physical downlink control channel (PDCCH) could be implemented.

It is to be noted that the interference contribution parameter or power offset parameter as introduced in this document is different from the parameter P_c used in Release 10 for scaling CQI. Here, the (newly defined) interference contribution parameter is used for scaling individual components of interference rather than the overall CQI or individual components of the payload ("useful") signal.

Additionally, as will be discussed later, this may involve under at least an exemplary modification, a configuration for the terminal UE with two separate power offsets parameters (potentially per point), i.e. the interference contribution parameter alpha and the parameter P_c mentioned above.

An example of CQI computation for the case of three co-operating cells or points will be given with following notation:

$W=W(H_0,H_1,H_2,\alpha_0,\alpha_1\alpha_2,N)$ is the receiver filter for a MIMO stream;

(Note that the exact receiver filter depends on the CoMP scheme assumption (transmission assumptions) and on assumptions what kind of receive filtering is used. A typical assumption is an MMSE type (minimum mean square error) of receiver.

For such receiver type, channels from transmission points that transmit the useful signal (payload) are aggregated into one $H_{own}$ and transmission points generating interference are summed in $H_{int}$.

Then $w=H_{own}^H(H_{own}H_{own}^H+H_{int}H_{int}^H+R_N)^{-1}$, where $(\ )^H$ is conjugate transpose and $R_N$ is the noise covariance. For white noise it would be an identity matrix times the noise variance.) $H_i$ is the effective radio channel (channel transfer function) including precoding from transmission point i;

N is the thermal noise plus, originating also from interference power outside of the CoMP measurement set;

(Note that N includes the thermal noise that is determined as the thermal noise level at the receiver. Thermal noise is independent of the transmission scheme. N includes also the interference power level of interference coming outside the CoMP set.)

$\alpha_i$ is the power offset parameter (i.e. interference contribution parameter) signaled to UE, corresponding to transmission point i.

The final CQI feedback can be based on the signal to interference noise ratio, SINR, for example for a transmission hypothesis that only transmission point of index i=0 is transmitting (the payload or "useful" signal) and signals from transmission points i=1 and i=2 are interference. Other hypotheses can be made, for example that point 1 is transmitting the payload and rest are interference etc.

The SINR is the computed as follows according to an aspect of the invention:

$$SINR = \frac{\alpha_0 W H_0 H_0^H W^H}{WNW^H + \alpha_1 WH_1 H_1^H W^H + \alpha_2 WH_2 H_2^H W^H},$$

The smaller the values of the power offset parameter, i.e. the interference contribution parameter $\alpha_i$ are, the closer to muting the interference assumptions are. Thus, with these interference contribution parameters $\alpha_i$, flexible configurations between full interference and muting are possible to be indicated to the UE.

Hence, by controlling the parameters and informing them to the UE, the network, i.e. eNB, can implement different CoMP schemes, e.g.:

$\alpha_i=0$ implies that the UE will assume blanking of the transmission from such transmission point linked to CSI-RS resource(s) i in CQI calculation;

$0 \leq \alpha_i < 1$ implies that UE will assume reduced interference from such transmission point(s) linked to the CSI-RS resource(s) i in the CQI calculation. This could be for example due to spatial coordination (e.g. CB) or coordinated scheduling (CS) (e.g. reducing transmission power for interfering point).

Alternatively, the value can contain the scaling difference P_c between the PDSCH and CSI-RS EPRE like in the prior art system. Insofar, a parameter assigned to the point/resource carrying the payload signal may have two components $\alpha_0$ and P_c.

Namely, if the transmission point is transmitting the desired payload signal, alpha does not apply. The UE can still be configured with whatever value for alpha, but if in the CoMP transmission hypothesis UE assumes that desired signal is transmitted from the point, alpha is just not used.

That is, interference contribution parameter α may be 1 or α may be P_c for the serving point (transmitting the payload in assigned resources). For interfering points α may be between 0 and 1, if it does not include P_c, or between 0 and P_c if it does include P_c. If α does include P_c, then P_c is not signalled separately but the α may be defined as another parameter in addition to the P_c.

Stated in other words, a first way is to have two parameters for each point, namely alpha and P_c. When the corresponding point is taken as (assumed to transmit) the desired signal in the CoMP transmission hypothesis, use is made of P_c. When it is taken as interference, use is made of alpha for the scaling.

A second way is that alpha is used on top of P_c, i.e. it is always scaled by both the interference. Then for useful signal we scale by P_c (alpha is then fixed to 1), and for interference we scale by alpha*P_c.

As mentioned, power is scaled by two factors, by P_c due to transmit power offset and by α as an interference contribution parameter that describes the reduction in interference level. The α can be defined in exemplary embodiments as scaling factor that includes both, but should at least include the indications of the reduction of the interference level, but when scaling, in exemplary embodiments, both the interference contribution parameter and P_c should be taken into account.

Figure 2:
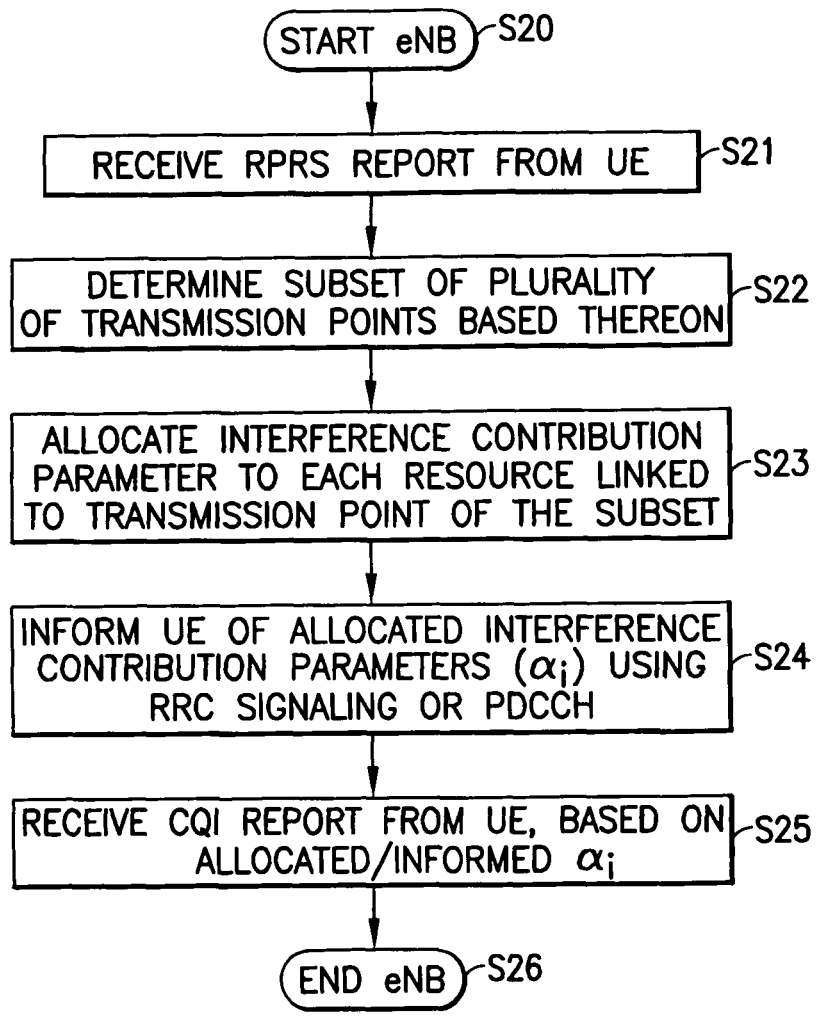
FIG. 2 illustrates a flow chart of a processing at a network device such as an evolved NodeB eNB.

A corresponding exemplary eNB procedure is as follows, and as shown in FIG. 2. The procedure starts in a step S20. Subsequently, a RSRP report is received in a step S21 from a UE. Based thereon, in a step S22, a subset of a plurality of transmission points is determined for subsequent use. Then, in a step S23, the eNB allocates interference contribution parameters to each resource linked to a transmission point of the subset. Then, in a step S24, eNB informs the UE of the allocated interference contribution parameters $\alpha_i$. This can be accomplished using RRC signaling or (as a faster option) a PDCCH signaling. The UE uses the signaled interference contribution parameters in obtaining a parameter reflecting channel quality, such as a CQI parameter. This CQI report obtained based on the allocated/informed $\alpha_i$ interference contribution parameters is received at the eNB from the UE in a step S25. Then, the process ends in a step S26 (or is restarted again afterwards based on a trigger).

Thus, as outlined above, the eNB configures the UE with multiple non-zero-power CSI-RS configurations (interference contribution parameters allocated to linked resources represented by reference signals RS in a PRB) according to the determined CoMP reporting set. The CoMP reporting set may be determined for example based on received RSRP reports from the UE. Based on the applied CoMP strategy, the eNB configures the UE with the power offsets parameters (interference contribution parameters) that the UE assumes in CQI calculation for the interfering points. The eNB may also additionally configure the UE with the further power offsets P_c that UE should assume in CQI calculation for transmitting points or resources carrying payload/useful signals) (or for the overall CQI).

In one embodiment this informing is done via RRC, e.g. when configuring the UE with the multiple non-zero-power CSI-RS configurations. In another embodiment this informing is done via dynamic signaling on PDCCH.

Then, the eNB receives the CSI report from the UE, including CoMP CQI.

Figure 3:
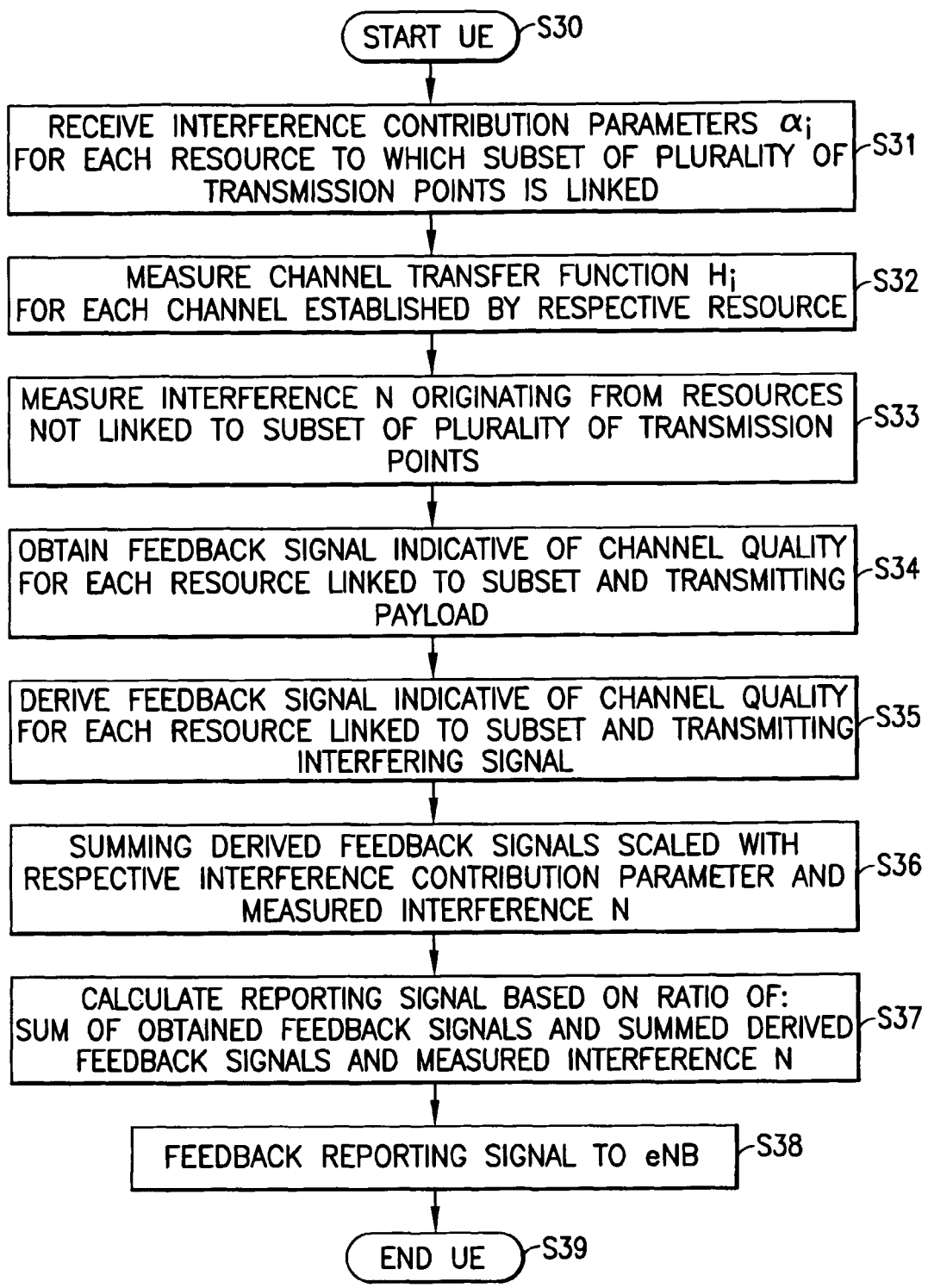
FIG. 3 illustrates a flow chart of a processing at a terminal device such as an user equipment UE.

A corresponding exemplary UE procedure is as follows, and as shown in FIG. 3. The process starts in a step S30. In a step S31, the UE receives interference contribution parameters $\alpha_i$ for each resource (e.g. reference signal in a PRB) to which a subset of the plurality of transmission points is linked. In a step S32, the UE measures the channel transfer function $H_i$ for each channel established by a respective resource (or reference signal), i.e. linked transmission point (s). Also, in a step S33, interference N which originates from resources not linked to the subset of the plurality of transmission points is measured.

Then, in a step S34, a feedback signal is obtained that is indicative of channel quality for each resource linked to the subset and which resource transmits a "useful", i.e. payload signal (non-interfering signal). Similarly, in a step S35, a feedback signal is obtained that is indicative of channel quality for each resource linked to the subset and which resource transmits an interfering signal.

In a subsequent step S36, summing (adding) is performed of the derived feedback signals scaled with the respective interference contribution parameter and measured interference N.

Then, in a step S37, a reporting signal is selected for being fed back to the another device (i.e. eNB) based on the result of summing and the respective channel quality. That is, such selection can exemplarily be accomplished based on calculating the ratio of: the sum of obtained feedback signals (payload related) and the summed derived feedback signal (interference related) plus measured interference N. Thus, calculation is as set out above in relation to calculation of SINR which is used to obtain the CQI as the reporting signal which is then fed back in step S38 to the eNB. Subsequently, the process ends in step S39 (or is restarted again afterwards based on a trigger such as receipt of an update of interference contribution parameters for another CoMP configuration).

Thus, as outlined above, the UE receives (S31) from the eNB via higher layer signaling (RRC) multiple non-zero-power CSI-RS configurations and the power offset parameter sets: a power offset parameter set that is to be assumed for interfering points in CQI computation, and a power offset parameter set that is to be assumed for transmission points transmitting useful (payload) signal in the CQI computation.

Additionally the UE may receive a RS (which can be zero-power CSI-RS, non-zero power CSI-RS, or other types of RS) configuration e.g. for interference measurement purposes (which are used to determine interference of outside the CoMP set).

Alternatively, the UE may receive the power offset parameters (interference contribution parameters) for interfering points as part of PDCCH signaling, for example within the UL grant that triggers CSI reporting. This allows more dynamic operation of different CoMP schemes (e.g. complete muting versus interference reduction).

UE measures (S32) channel $H_i$ corresponding to the multiple non-zero-power CSI-RS resources, each typically mapped or linked to one transmission point.

UE measures (S33) interference (parameter N in the above formula for SINR calculation) originating from outside of the CoMP measurement set, e.g. in either of the following ways:
- Measuring the interference power directly from configured RS resources or other muted RE resources that reflect the interference outside of the CoMP measurement set, or
- Subtracting the channel contribution inside the CoMP measurement set from RS locations and measuring the underlying interference power. If for example zero-power CSI-RS are used for interference measurement, with the assumption that zero-power CSI-RS resources have been configured properly such that exactly the CoMP measurement set points are muting their transmissions, the UE will be measuring exactly the correct interference power.

For each CoMP transmission hypothesis, the UE computes (S37) the CoMP CQI as follows:

For each CSI-RS resource (point) transmitting to the UE, UE computes (S34) the relevant feedback (PMI/CQI), and considers the signal as a useful signal in the CQI computation. The useful signal may be scaled with a transmission point specific scaling factor (power offset P_c, generally distinct from $\alpha_i$) intended to scale useful i.e. payload signal.

For each CSI-RS resource (point) within the CoMP reporting (measurement) set transmitting an interfering signal, the UE scales (S35) the channel measured from non-zero-power CSI-RS resources with the (potentially CSI-RS or transmission point specific) scaling factor (interference contribution parameter) and adds it to the measured interference (summing in S36).

In CQI calculation, UE would most likely assume the best PMI for the interfering points, however the invention does not preclude using any other PMI as the PMI assumption.

The UE reports the CoMP CQI to the eNB based on the calculation in S38.

Other CoMP systems can benefit also from the principles presented herein as long as they rely on an identical or similar interference contribution parameter allocated to each resource linked to a subset of the plurality of transmission points designated for transmission towards another device, wherein the interference contribution parameter is indicative of an expected interference contribution originating from said transmission point.

Embodiments of the present invention may be implemented in software, hardware, application logic or a combination of software, hardware and application logic. The software, application logic and/or hardware generally resides on control modules or modems. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

The present invention relates in particular but without limitation to mobile communications, for example to CoMP enabled environments under WCDMA, LTE, WIMAX and or WLAN and can advantageously be implemented in user equipments or smart phones, or personal computers connectable to such networks as well as in network devices such as eNBs. That is, it can be implemented as/in chipsets to such devices, and/or modems thereof.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made

| List of exemplary acronyms used in this document: | |
|---|---|
| CB | coordinated beamforming |
| CoMP | coordinated multipoint transmission |
| CS | coordinated switching |
| CSI-RS | channel state information reference signal |
| CQI | channel quality indicator |
| DL | downlink |
| DPS | dynamic point selection |
| JT | joint transmission |
| PDCCH | physical downlink control channel |
| PMI | precoding matrix information |
| RRC | radio resource control |
| RSRP | reference signal received power |

The present invention proposes methods and devices related to controlling UE assumption of interference. To this end, there is proposed a device, comprising a controller module, configured to control a plurality of transmission points, each constituted by a set of at least one transmit antenna, to transmit data to another device in a coordinated transmission from at least a subset of the plurality of transmission points, wherein the controller module is configured to allocate, to each resource linked to the subset of the plurality of transmission points designated for transmission towards the another device, an interference contribution parameter that is indicative of an expected interference contribution originating from said transmission point, and to inform said another device of those resources to which the subset of the plurality of transmission points designated for transmission towards the another device is linked, together with the respective interference contribution parameter allocated to each resource. Another device comprises a controller module configured to report feedback, wherein the feedback signal is based on signals which are scaled with the respective interference contribution parameter allocated to the respective resource.

The invention claimed is:

1. A base station, comprising:
   circuitry configured to
   control a plurality of transmission points, each constituted by a set of at least one transmit antenna, to transmit data to another device in a coordinated transmission from at least a subset of the plurality of transmission points;
   allocate, to each resource linked to the subset of the plurality of transmission points designated for transmission towards the another device, an interference contribution parameter that is indicative of an expected interference contribution originating from said transmission point; and
   inform said another device of those resources to which the subset of the plurality of transmission points designated for transmission towards the another device is linked, together with the respective interference contribution parameter allocated to each resource.

2. The base station according to claim 1, wherein:
   said circuitry is configured to inform said another device in a resource control signaling.

3. The base station according to claim 1, wherein:
   said circuitry is configured to inform said another device using downlink control channel based signaling.

4. The base station according to claim 1, wherein:
   said circuitry is configured to receive from said another device, a report indicative of a quality of a channel established between the base station and the another device.

5. The base station according to claim 1, wherein said circuitry is configured to:
   receive, from said another device, a report indicative of received power pertaining to transmitted reference signals; and
   determine the subset of the plurality of transmission points designated for transmission responsive thereto.

6. The base station according to claim 1, wherein said circuitry is configured to:
   allocate, to each resource linked to at least a fraction of the subset of the plurality of transmission points designated for transmission towards the another device, a parameter that is indicative of no expected interference contribution originating from said transmission point; and
   allocate, to each resource linked to at least a complementary fraction of the subset of the plurality of transmission points designated for transmission towards the another device, an interference contribution parameter that is indicative of an expected interference contribution originating from said transmission point.

7. A method of operating a wireless radio network, the method comprising at least one base station of the network:
   controlling a plurality of transmission points, each constituted by a set of at least one transmit antenna, to transmit data to another device in a coordinated transmission from at least a subset of the plurality of transmission points;
   allocating, to each resource linked to the subset of the plurality of transmission points designated for transmission towards the another device, an interference contribution parameter that is indicative of an expected interference contribution originating from said transmission point; and
   informing said another device of those resources to which the subset of the plurality of transmission points designated for transmission towards the another device is linked, together with the respective interference contribution parameter allocated to each resource.

8. The method according to claim 7, further comprising:
   informing said another device in a resource control signaling.

9. The method according to claim 7, further comprising:
   informing said another device using a downlink control channel based signaling.

10. The method according to claim 7, further comprising:
    receiving from said another device, a report indicative of a quality of a channel established between the at least one base station and the another device.

11. The method according to claim 7, further comprising:
    receiving, from said another device, a report indicative of received power pertaining to transmitted reference signals, and
    determining the subset of the plurality of transmission points designated for transmission responsive thereto.

12. The method according to claim 7, further comprising:
    allocating, to each resource linked to at least a fraction of the subset of the plurality of transmission points designated for transmission towards the another device, a parameter that is indicative of no expected interference contribution originating from said transmission point, and allocating, to each resource linked to at least a complementary fraction of the subset of the plurality of transmission points designated for transmission towards the another device, an interference contribution parameter that is indicative of an expected interference contribution originating from said transmission point.

13. A device, comprising a controller module, configured to report feedback to another device responsive to the another device's coordinated transmission from at least a subset of a plurality of transmission points, each transmission point being constituted by a set of at least one transmit antenna, wherein the controller module is configured to:
receive, for each resource to which the subset of the plurality of transmission points designated for the another device's coordinated transmission is linked, a respective interference contribution parameter allocated to each resource and indicative of an expected interference contribution originating from said respective transmission point,
measure a channel transfer function for each channel established towards the device by a respective resource to which the subset of the plurality of transmission points designated for the another device's coordinated transmission is linked,
measure interference originating from resources not linked to said subset of the plurality of transmission points,
obtain a feedback signal indicative of the channel quality for each resource linked to the subset of the plurality of transmission points and transmitting a payload signal,
derive a feedback signal indicative of the channel quality for each resource linked to the subset of the plurality of transmission points and transmitting an interfering signal,
sum the derived feedback signals scaled with the respective interference contribution parameter allocated to the respective resource, and the measured interference, and
select a reporting signal for being fed back to the another device based on the result of summing and the respective channel quality.

14. The device according to claim 13, wherein:
respective interference contribution parameters have a value greater than zero and are indicative for a transmission from the transmission point linked to the resources.

15. The device according to claim 14, wherein:
a value of the interference contribution parameter greater than zero and smaller than "1" denotes a reduction in interference level, while a value greater than "1" denotes an increased interference level.

16. The device according to claim 13, wherein:
respective interference contribution parameters have a value equal to zero and denote no transmission from the transmission point linked to the resources.

17. The device according to claim 13, wherein:
the controller module is configured to measure interference originating from resources not linked to said subset of the plurality of transmission points such that interference is measured directly only from those resources not linked to the subset of the plurality of transmission points.

18. The device according to claim 17, wherein:
those resources not linked to the subset are selected for measurement based on their configuration to be assumed to be muted due to being attributed a transmission with zero power or a maximum interference reduction.

19. The device according to claim 13, wherein:
the controller module is configured to measure interference originating from resources not linked to said subset of the plurality of transmission points by measuring the overall interference and then subtracting the contribution of those resources linked to said part of said subset of the plurality of transmission points, which are identified due to being attributed a transmission with zero power or a maximum interference reduction.

20. The device according to claim 13, wherein the controller module is configured to select the reporting signal by calculating the reporting signal for being fed back to the another device based on a ratio of:
a sum of the obtained feedback signals, and
the summed derived feedback signals plus the measured interference.

21. A method for operating a wireless device, the method comprising:
reporting feedback to another device responsive to the another device's coordinated transmission from at least a subset of a plurality of transmission points, each transmission point being constituted by a set of at least one transmit antenna,
receiving, for each resource to which the subset of the plurality of transmission points designated for the another device's coordinated transmission is linked, a respective interference contribution parameter allocated to each resource and indicative of an expected interference contribution originating from said respective transmission point,
measuring a channel transfer function for each channel established towards the wireless device by a respective resource to which the subset of the plurality of transmission points designated for the another device's coordinated transmission is linked,
measuring interference originating from resources not linked to said subset of the plurality of transmission points,
obtaining a feedback signal indicative of the channel quality for each resource linked to the subset of the plurality of transmission points and transmitting a payload signal,
deriving a feedback signal indicative of the channel quality for each resource linked to the subset of the plurality of transmission points and transmitting an interfering signal,
summing the derived feedback signals scaled with the respective interference contribution parameter allocated to the respective resource, and the measured interference, and
selecting a reporting signal for being fed back to the another device based on the result of summing and the respective channel quality.

22. The method according to claim 21, wherein:
respective interference contribution parameters have a value greater than zero and are indicative for a transmission from the transmission point linked to the resources.

23. The method according to claim 22, wherein:
a value of the interference contribution parameter greater than zero and smaller than "1" denotes a reduction in interference level, while a value greater than "1" denotes an increased interference level.

24. The method according to claim 21, wherein:
respective interference contribution parameters have a value equal to zero and denote no transmission from the transmission point linked to the resources.

25. The method according to claim 21, further comprising:
measuring interference originating from resources not linked to said subset of the plurality of transmission points such that interference is measured directly only from those resources not linked to the subset of the plurality of transmission points.

26. The method according to claim 25, wherein:
those resources not linked to the subset are selected for measurement based on their configuration to be assumed to be muted due to being attributed a transmission with zero power or a maximum interference reduction.

27. The method according to claim 21, further comprising:
measuring interference originating from resources not linked to said subset of the plurality of transmission points by measuring the overall interference and then subtracting the contribution of those resources linked to said part of said subset of the plurality of transmission points, which are identified due to being attributed a transmission with zero power or a maximum interference reduction.

28. The method according to claim 21, wherein selecting the reporting signal comprises calculating the reporting signal for being fed back to the another device based on a ratio of:
a sum of the obtained feedback signals and,
the summed derived feedback signals plus the measured interference.

* * * * *